UNITED STATES PATENT OFFICE.

SAMUEL L. CROCKER, OF TAUNTON, MASSACHUSETTS.

IMPROVEMENT IN REFINING COPPER, &c.

Specification forming part of Letters Patent No. 159,801, dated February 16, 1875; application filed October 12, 1874.

*To all whom it may concern:*

Be it known that I, SAMUEL L. CROCKER, of Taunton, county of Bristol and Commonwealth of Massachusetts, have invented an Improved Process of Smelting and Refining Copper Ores and Metallic Copper, of which the following is a specification:

The object of this invention is to provide a practicable and useful method of removing such impurities as arsenic and antimony during the process of smelting copper ore, or of refining metallic (crude or pig) copper, in the furnace.

It is well known to smelters of copper ore and refiners of metal that it is impossible to completely remove these impurities by any process of smelting or refining heretofore in common use; and ores or coppers known to contain either arsenic or antimony, or both, are generally rejected by smelters as being of inferior value.

I have discovered that, by the aid of zinc, added in small quantity in the furnaces to the ores or to the partially-refined metallic copper containing arsenic and antimony, these impurities can be readily removed at very small cost. I have found that zinc in any of its forms, either refined or crude material, such as spelter, hard spelter, (an alloy of zinc and iron, made in the so-called process of galvanizing iron,) brass, and other alloys, oxides, scoria, slag, natural ores of zinc, &c., may be used for this purpose, the value of the material depending upon the proportion of zinc contained in it.

I have employed the following modes of practicing my invention, and find them to yield good results:

When smelting an ore containing about thirty per cent. of copper and four or five per cent. of arsenic, I put into the smelting-furnace, with the copper ore, about one-quarter as much zinc slag as of ore, and run them together, as in the ordinary method of smelting copper ore alone.

The zinc slag is such as is commonly made in foundries where zinc and brass are melted. It contains about twenty-five per cent. of zinc, the remainder being iron, copper, silica, &c.

During the smelting of the copper ore and zinc slag together, fumes and vapors of the zinc will be seen passing off from the furnace; and it is my belief that the arsenic, antimony, and other volatile metals are carried off with them.

The copper taken from furnaces charged in this way, after refining in the usual manner, yields a soft malleable metal, containing no appreciable arsenic, and but traces of zinc, if there be any at all.

When refining pig-copper or crude copper containing arsenic, I melt with it from two to six per cent. of its weight of spelter, or metallic zinc, in the refining-furnaces, and conduct the refining process in the usual manner. The zinc is driven off in this case, also, apparently carrying the volatile impurities with it.

I do not confine myself to these exact modes of practicing my invention, nor to these proportions of zinc, or materials containing zinc; nor do I confine myself to any particular form of furnace in which to make the meltings.

It will be evident to persons familiar with the art that zinc should not be added in quantity so large as to produce an alloy, instead of nearly pure copper. The office of the zinc being to remove impurities and volatile metals from the copper, it should only be used in such quantities as may be found necessary to accomplish this result.

Having thus described my discovery and invention, I claim as new and desire to secure by Letters Patent—

The process of removing arsenic, antimony, and other volatile metals from copper in the smelting or refining furnaces by the aid of zinc, substantially as herein described.

SAML. L. CROCKER.

Witnesses:
 EDWARD R. HALL,
 T. E. LARNED, Jr.